United States Patent

[11] 3,569,722

| [72] | Inventor | Costel D. Denson<br>Schenectady, N.Y. |
|---|---|---|
| [21] | Appl. No. | 836,396 |
| [22] | Filed | June 25, 1969<br>Division of Ser. No. 734,739, June 5, 1968,<br>Patent No. 3,495,445. |
| [45] | Patented | Mar. 9, 1971 |
| [73] | Assignee | General Electric Company |

[54] APPARATUS FOR MEASURING THE THICKNESS OF A LIQUID DRAINING FROM A VERTICALLY DISPOSED SURFACE
10 Claims, 6 Drawing Figs.

[52] U.S. Cl. .................................................. 250/218,
73/53, 250/219, 356/201
[51] Int. Cl. ....................................................... G07n 23/12

[50] Field of Search ............................................ 73/54, 53;
356/201; 250/43.5, 219 (th); 324/61

[56] References Cited
UNITED STATES PATENTS
3,043,956  7/1962  Cohen .......................... 250/43.5X Primary Examiner—Louis R. Prince
Assistant Examiner—Joseph W. Roskos
Attorneys—Paul A. Frank, Richard R. Brainard, Charles T. Watts, Leo I. Ma Lossi, Frank L. Neuhauser, Oscar B. Waddell and Joseph B. Forman ABSTRACT: An apparatus for determining the thickness of a draining liquid film having a wave energy source and a wave energy detector. The liquid is supported on a vertical substrate between the wave energy source and the detector. The energy transmitted through the liquid at any time is a function of the thickness of the film.

Inventor:
Costel D. Denson,
by [signature]
His Attorney.

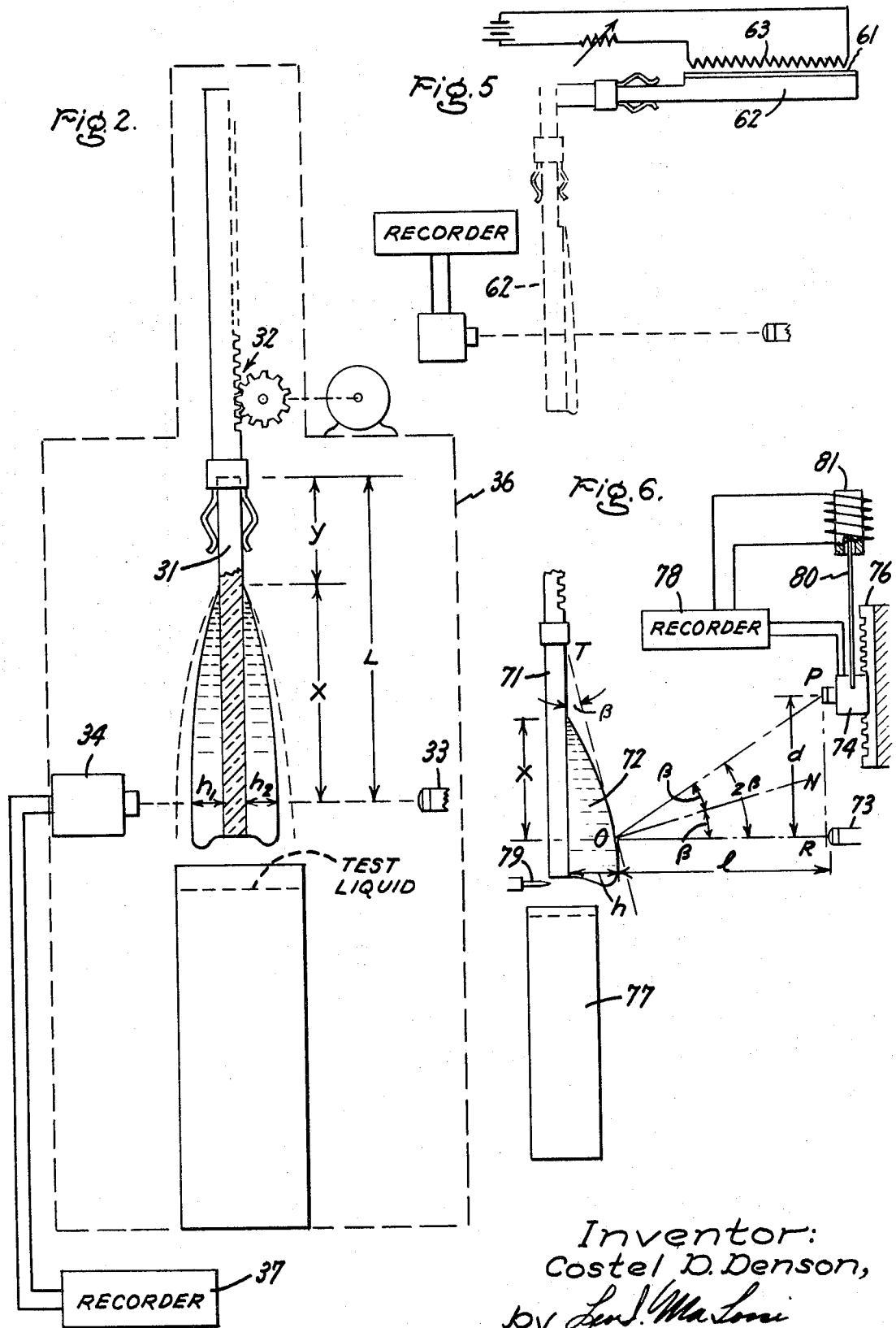

APPARATUS FOR MEASURING THE THICKNESS OF A LIQUID DRAINING FROM A VERTICALLY DISPOSED SURFACE

BACKGROUND OF THE INVENTION

This application is a division of Pat. application Ser. No. 734,739–Denson, filed Jun. 5, 1968, now U.S. Pat. Ser. No. 3,495,445.

There are at least three general categories of measuring devices for determining shear viscosity; namely, the capillary tube type, the rotational (or sliding) type, and the oscillatory type. Viscosity determination using any of these types of apparatus is time consuming and requires that the operator direct his fullest attention thereto during operation. Both the capillary tube and oscillatory types of apparatus require a tedious trial and error procedure for the selection of the proper size tube and reed, respectively.

Viscosities of liquids are determined in general either by applying a known shear stress to the liquid and determining the shear rate or by applying a known shear rate and measuring the resultant shear stress. In accordance with this:

ABSOLUTE VISCOSITY ($\eta$)—a number defined as the shearing stress divided by the shear rate and represents the resistance to flow.

KINEMATIC VISCOSITY ($\nu$)—defined as the quotient of the absolute viscosity and the density ($\eta/\rho$).

ZERO SHEAR RATE VISCOSITY ($\eta o$)—a term used in connection with non-Newtonian liquids and represents the value of the viscosity, which obtains at very low shear rates where non-Newtonian liquids behave as Newtonian liquids. Thus, this viscosity is an asymptotic value and may be referred to as the low shear Newtonian viscosity.

ZERO SHEAR RATE KINEMATIC VISCOSITY ($\nu o = \eta o/\alpha\lambda$')—the zero shear rate viscosity divided by the density. Since $\rho$ is not a function of the shear rate $\nu o$ is directly proportional to $\eta o$.

INTRINSIC VISCOSITY [$\eta$]—defined by the equation $$[\eta] = \frac{\frac{\eta}{\eta_s} - 1}{c}$$

and refers to the viscosity at infinite dilution [$C-o$] of a polymer dissolved in a solvent.

$\eta$ = absolute viscosity of the solution [poise]
$\eta s$ = absolute viscosity of the solvent [poise]
$C$ = concentration of polymer in solvent [gms/deciliter]

Although intrinsic viscosity has been employed in characterizing new polymers with respect to their molecular weight and processability and in quality control work to monitor the variation in production lots of polymeric materials, the aforementioned conventional techniques for determining this parameter, are time consuming and, with respect to determining molecular weights of non-Newtonian fluids, such as polymers, can be grossly misleading.

In the text "A Monograph of Viscometry" by Guy Barr (Oxford Press 1931) on page 264 the statement appears that "When a vertical plate wetted surface is allowed to drain, the thickness of the film of liquid which remains after a given time is approximately proportional to the square root of the kinematic viscosity," thus proposing that such a technique be employed to determine the kinematic viscosity of a liquid.

Indication is given in "Viscometry," a textbook by A. C. Merrington Jarrold and Sons, Ltd. 1949, that the viscosity of a liquid might be measured by withdrawing a flat plate or wire at a steady speed from the liquid and measuring the thickness of the adhering film. Also, it is reported that a theoretical study of the profile of a liquid film draining from a flat plate has been made from which it was concluded that in a thin film, initially of uniform thickness, the drainage profile (assuming nearly laminar flow) has a parabolic shape described by the relationship:

$$h^2 = \frac{\nu}{g t} x \quad (1)$$

where $x$ is the distance downwards from the top of the wetted portion, $h$ is the film thickness, $t$ is the time allowed for drainage.

Experiments referred to in the "Viscometry" text with glycerine, olive oil and mixtures of water, glycerine and alcohol (all of which are Newtonian fluids) confirmed the parabolic formula. The viscosity parameter $\nu$ considered in these experiments was a known quantity (characterized as kinematic viscosity in the Barr text) separately determined by conventional techniques and no consideration appears to be given to non-Newtonian liquids or to zero shear kinematic viscosity as a parameter for any liquid. The film thickness in none experimental study was determined by measuring light interference fringes resulting from the impingement of light on a film-coated substrate and reflection of the light from the substrate. Such a reflected light technique is useable only with very thin films. In the case of more viscous liquids a long drain time is required to allow the film to thin down sufficiently.

Therefore, the literature has suggested the use of the draining plate technique for determining kinematic viscosity and a method of limited application has been disclosed for measuring film thickness. However, at no time has it been suggested that this draining plate method for viscosity determination, when applied to non-Newtonian liquids, will actually provide a measure of the zero shear kinematic viscosity of such liquids. The need for a simple, reliable method for determining zero shear kinematic viscosity may be established by an examination of the article by Porter and Johnson [Chemical Reviews 66, 1 (1966)]. On page 3 (column 1) of this article it is pointed out that the "Newtonian viscosity, $\eta o$, for many different amorphous polymers in bulk and at fixed diluent concentration is observed to increase sharply to a constant $3.4 \pm 0.1$ power dependence on $M_w$ as $M_c$ is exceeded ... " In view of the evolving language in the field of viscometry it should be explained that the term "low shear Newtonian viscosity" and the symbol $\eta o$ therefor are actually understood in the art to represent the asymtotic value of the shear viscosity $\eta$ of a polymer, which is manifest at low shear. These viscosity expressions, $\eta o$ and $\eta$, are directly related to the expressions, $\eta o/\rho$ (zero shear kinematic viscosity) and $\eta/\rho$ (kinematic viscosity), respectively, since the density $\rho$ for any given material is a constant at the same temperature. Thus, in essence the capacity to directly measure zero shear kinematic viscosity of a polymer or polymer solution enables a rapid indication of weight average molecular weight $M_w$ of the material according to the relationship expressed on page 10 (column 2) of the Porter et al. article stating that $\eta$ is proportional to $M_w^{3.5}$.

Therefore, in both process control operations and in chemical laboratories there has been established a need for instrumentation to provide for direct and accurate determination of the molecular weights of polymers both in the bulk liquid phase and when in solution.

SUMMARY OF THE INVENTION

The above-described need has been filled by the construction and teachings of the instant invention.

In the preferred construction of the apparatus of this invention there are provided in combination means for emitting wave energy, means spaced from said energy emitting means and located in the path of energy transmission therefrom for sensing and measuring as a function of time and energy transmitted thereto from said energy transmitting means, a flat plate for vertically disposing a film of liquid draining from at least one surface thereof and means for supporting said flat plate and the draining film of liquid in series in the path of energy transmission.

Using monochromatic light, for example, as the wave energy a few drops of the liquid to be tested may be placed on a flat quartz plate disposed in the horizontal position and then indexed to a fixed vertical position relative to a monochromatic light source and a photomultiplier arranged in alignment with the light passing through the plate and liquid. A recorder connected to the photomultiplier records as a function of time the intensity of light transmitted through both the transparent quartz plate and the film of liquid as it drains under the force of gravity, as it is sensed and measured by the photomultiplier. As time passes and the film drains, it becomes thinner. At any given time the film thickness can be determined by measuring the intensity of monochromatic light of known intensity transmitted through the film. Once the film thickness has been measured as a function of time the value of the zero shear kinematic viscosity can be calculated from the film thickness, the drain time at the time of film thickness determination, the distance below the upper edge of the film (top of the wetted portion) at which the thickness was measured and gravitational acceleration.

Regardless of the particular time at which the thickness is measured, the value obtained for the zero shear kinematic viscosity should be substantially constant once the liquid has had the opportunity to adjust itself to its gravity drain configuration, which is parabolic.

A computer properly programmed to determine and read out a zero shear kinematic viscosities (or average molecular weights) of tested liquids may advantageously be employed in an apparatus in which each of a series of flat plates has a film of a different liquid sample applied thereto and then are sequentially moved into register in detecting equipment such as has been described above.

BRIEF DESCRIPTION OF THE DRAWING

The exact nature of this invention as well as objects and advantages thereof will be readily apparent from consideration of the following specification relating to the annexed drawing in which:

FIG. 2 schematically illustrates preferred apparatus for determining the thickness of a film draining from a flat transparent plate and indicates specific parameters required for the determination of zero shear kinematic viscosity (for increased clarity of illustration, the drawing is not made to scale with respect to the relative thickness of the draining liquid film and flat plate);

FIG. 5 is a schematic representation of a second arrangement specifically employed with sample materials, which are solid at room temperature; and FIG. 6 is still another arrangement for determining zero shear kinematic viscosity wherein reflective techniques are employed and the slope of the draining film (shown greatly exaggerated) is measured.

DESCRIPTION OF THE PREFERRED EMBODIMENT

Figure 1:
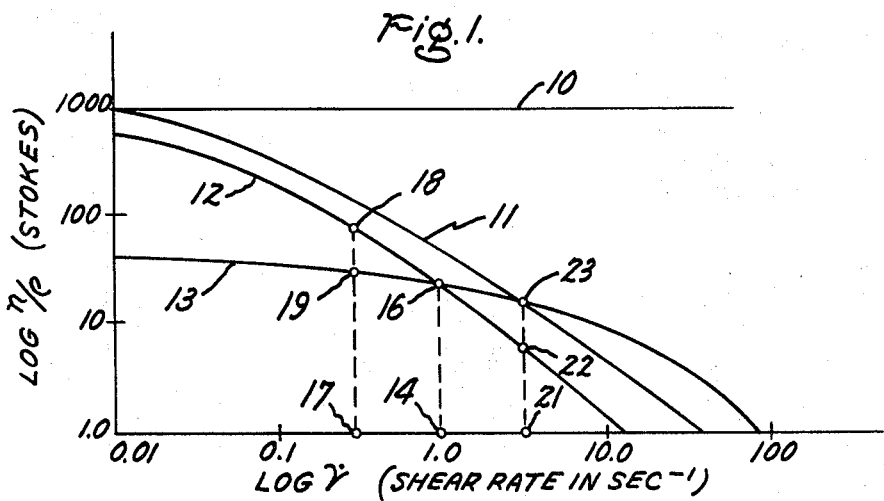
FIG. 1 is a logarithmic graph showing representative curves for both Newtonian and non-Newtonian liquids including curves obtained for several polymers either in the bulk liquid or in solution (log kinematic viscosity [in stokes] is plotted as a function of log shear rate [in sec.$^{11}$])

Curve 10 in FIG. 1 is a straight line indicating that the kinematic viscosity of Newtonian liquid, such as a pure inorganic liquid, retains a constant value regardless of the rate of shear application thereto, thus the kinematic viscosity of such a liquid is the same as the zero shear kinematic viscosity. However, in the case of a bulk phase liquid polymer or a polymer in solution, there is no predeterminable relationship between kinematic viscosity and the rate of shear application. Three typical curves are shown (curves 11, 12 and 13).

It has been common in both laboratory and industrial preparation of polymers to make a determination of kinematic viscosity of a sample of the liquid polymer at some finite shear rate, usually a fairly significant value, and then to rely upon this determination of kinematic viscosity as some relative indication of the molecular weight of the sample. However, because of the lack of uniformity of the kinematic viscosity-shear rate behavior of various polymers and even of the same polymeric materials having a different molecular weight distribution, this method of assessing molecular weight can be grossly misleading.

As an example, assuming such a test being conducted on the polymers having the characteristic curves 12 and 13 and further assuming that these curves are unknown to the tester, if the test were to be carried out at a shear rate indicated by numeral 14, the resultant kinematic viscosity values would lead the tester to the assumption that these polymers have the same kinematic viscosity indicated by point 16, and therefore have the same molecular weight.

If the same test for kinematic viscosity were conducted at a lower shear rate (point 17), it would indicate that the polymer having characteristic curve 12 has a higher molecular weight than the polymer having characteristic curve 13 (as is indicated by the respective positions of numerals 18 and 19).

On the other hand, if the determinations of kinematic viscosity were to be conducted at a higher shear rate (point 21) the opposite conclusion would be reached by the tester, since it would appear that the molecular weight of the polymer having characteristic curve 13 is higher than the molecular weight of the polymer having characteristic curve 12. (Note points 22 and 23).

The recognition that low shear viscosity measurements offer a reliable basis for determining the weight average molecular weight of a bulk liquid polymer or polymer in solution is a relatively recent development as is the selection of shear viscosity at a zero shear as the desired parameter for this purpose. The determination of the asymtotic value of shear viscosity occurring at very low shear rates has by and large been accomplished by plotting shear viscosity-shear rate curves much as are shown in FIG. 1 (curves 11, 12, 13) determining the shear viscosity at lower shear rates to the extent and with the accuracy possible with the particular technique employed and then extrapolating into the region of low shear rates not possible to reach with existing equipment. One system for directly estimating the zero shear viscosity is described in Trans. of the Soc. of Rheology 11 (issue 2) 168, 175 (1967). The technique employs two ruby spheres and two steel spheres in a falling-sphere apparatus.

The zero shear kinematic viscosity of a given polymer, for example, can be determined by plotting the characteristic curve from a sample of the polymer and then extrapolating to zero shear, where the curve reaches some asymtotic value. However, at best this is tedious and sometimes it is impossible to do with any degree of accuracy.

A considerably simplified method and apparatus for directly determining zero shear kinematic viscosity $\eta_0/\rho$ has been evolved. The discovery has been made that kinematic viscosity determinations by the use of the draining plate technique suggested in the Barr and Merrington texts for viscosity measurement, when applied to non-Newtonian fluids actually provide that particular value for kinematic viscosity occurring under zero shear conditions. The mathematical relationship is much the same as Equation (1) above:

$$h^2 = \frac{(\eta_0/\rho)}{g^t} x \qquad (2)$$

wherein $h$(cm.), $g$(cm./sec.$^2$), $t$(sec.) and $x$(cm.) represent the same parameters as in Equation (1) and $\eta_0/\rho$ represents zero shear kinematic viscosity (stokes).

Thus, although the mathematical relationship required for the determination of kinematic viscosity has been available in the prior art, heretofore it was not recognized that the specific kinematic viscosity known as the zero shear kinematic viscosity would actually result from draining plate viscosity determination. The fact that the kinematic viscosity determination with a draining plate actually represents the zero shear value would be unimportant in the case of Newtonian fluids (curve 10 of FIG. 1) and it is only in the case of kinematic viscosity measurements of non-Newtonian fluids wherein the importance of this discovery is manifest and the term is applied.

However, this discovery alone would be of limited utility without some means by which the film thickness of the draining liquid could be quickly determined as a function of time over a wide range of viscosities.

A preferred arrangement of such an apparatus is disclosed in FIG. 2. A plate 31 made of a material, a for example quartz, which attenuates light to substantially zero degree and having a surface from which light reflection is substantially zero is immersed in the sample of liquid to be tested for zero shear kinematic viscosity to some preselected distance $y$ from the top of plate 31 by motor-driven rack and pinion device 32. The coated plate supported in an indexed position by device 32 is disposed substantially perpendicular to the centerline of aligned collimated monochromatic light source 33 and photomultiplier 34 in the vertical position as shown. The entire structure is enclosed in lightproof enclosure 36. A beam of light emerging from light source 33 will enter and pass through the films of liquid draining from each side of plate 31 at a specific distance $x$ below the top of the wetted portion portion.

The intensity of the beam of light leaving light source 33 is known and the intensity of the beam of light leaving the film-covered plate 31 is sensed and measured by photomultiplier 34, the output of which is recorded as a function of time by recorder 37. The relationship between these intensities measured at a specific point in time bears a distinct relationship to the liquid film thickness at that instant in accordance with the following formula:

$$\frac{I}{I_0} = e^{-\alpha h} \quad (3)$$

where $I_0$ represents the initial intensity of the light beam as it leaves light source 33;

$I$ is the intensity of light measured by photomultiplier 34 at a specific time ($I_0$ and $I$ being measured in the same unites);

$e$ is a constant having the value of 2.718;

$h$ is the liquid film thickness in cm. (in this case $h$ actually represents $h_1 + h_2$ as indicated in FIG. 2);

$\alpha$ is the extinction coefficient in $cm.^{11}$, a calibration constant for the material the viscosity of which is being measured.

Of the aforementioned parameters $I$ and $I_0$ are measured at the time of the determination of film thickness and $\alpha$ may be routinely determined. The method of determining $\alpha$ for any given liquid involves taking a sample of the given liquid material and putting it in a rectangular quartz cell the dimensions of which have been accurately determined. This rectangular cell is disposed transverse to the line of sight between a monochromatic light source of selectively variable wave length (not shown) and a photomultiplier, such as photomultiplier 34, whereby a known thickness of the sample of liquid is traversed by the light beam. $I$ and $I_0$ are then determined employing various wave lengths of monochromatic light until some wave length with which the greatest (or a substantially great) difference between $I$ and $I_0$ results. The determination of $\alpha$ from Equation (3) employing these diverse values for $I$ and $I_0$ provides the correct value of $\alpha$ at the selected wave length for this given liquid material. This same wave length is the wave length of light to be employed, when this given material is being tested in the apparatus of FIG. 2, and the temperature conditions should preferably remain the same.

The zero shear kinematic viscosity may be readily calculated from Equation (2) once $h$ has been determined from Equation (3) using the known values for $I_0$, $\alpha$ and $e$ and values of $I$ as a function of time obtained from recorder 37. In the arrangement in FIG. 2 it can be assumed that $h_1 = h_2$ and it is to be noted that the value for $h$ as determined by Equation (3) is considered the equal of $h_1 + h_2$.

Figure 3:
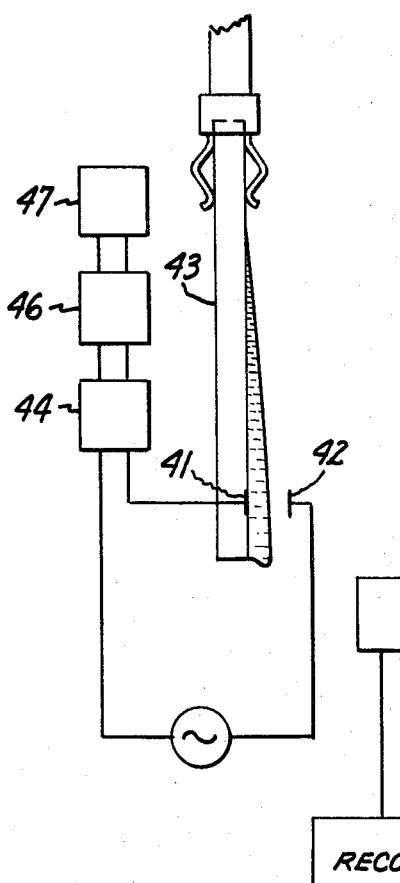
FIG. 3 is a schematic representation similar to FIG. 1 in which capacitor plates are employed in the determination of draining film thicknesses.
Figure 4:
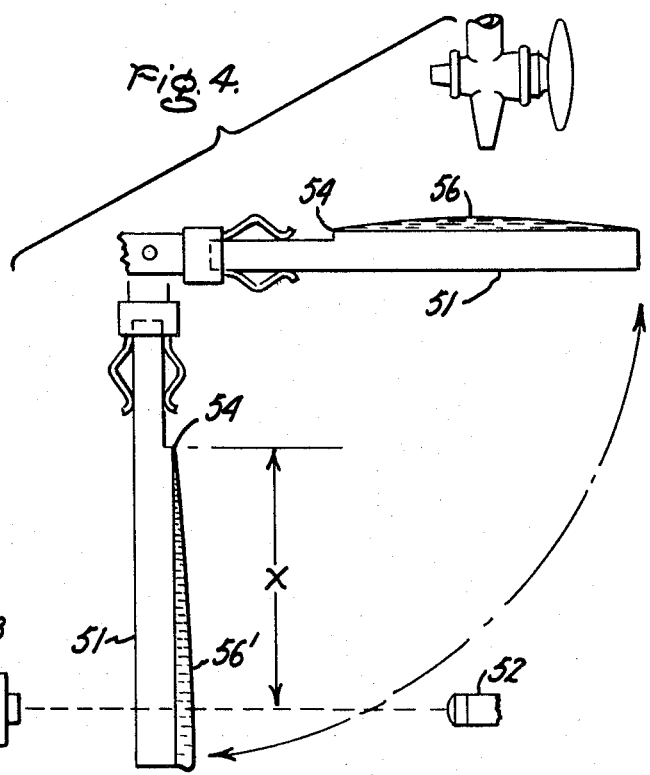
FIG. 4 schematically represents one arrangement whereby a film of sample liquid can be applied to the surface of the flat transparent plate and then swung to an indexed vertical position relative to the light source and light measuring instrument.

An alternate method for determining the film thickness is illustrated in FIG. 3 wherein a pair of capacitor plates 41 and 42 are employed. Flat plate 43 should, of course, be made of a dielectric material, but need not be transparent. In the composite capacitor so presented the capacitance will be a function of the capacitance of the film of liquid plus the capacitance of the film of air between plate 42 and the surface of the draining liquid. The application of a film of liquid to one side only of the flat plate (as shown) may be accomplished by applying the liquid to the plate while in the horizontal position and then moving the plate to some preselected position in the vertical attitude as shown in FIGS. 4 and 5. The change in capacitance is sensed by an auto capacitance bridge assembly 44 (as, for example, is marketed by General Radio Co. as Type 1680). Bridge assembly 44 provides a digital output which is transmitted to digital analogue converter 46, which in turn presents a signal to recorder 47 for display on a time base. The film thickness, $h$, may be calculated at any point in time with the relationship $$h = \left[\frac{K_L}{K_L - 1}\right]\left[d - \frac{\epsilon_0 A}{C}\right]$$

wherein: $K_L$ = dielectric coefficient of the liquid $K_L > 1.0$
  $d$ = separation of plates [meters]
  $\epsilon_0 = 8.85 \times 10^{112}$ coulombs2/newtons · meters$^2$
  $A$ = surface area of plates [meters$^2$]
  $C$ = capacitance [farads] measured at any given instant of time Equations (1) and (2) are valid relationships so long as some form of wave energy (electron beam, X-ray, visible light, ultraviolet light, infrared light, etc. is employed).

The device shown in FIGS. 4 and 5 is a modification of the apparatus in FIG. 2 specifically designed to place the film of liquid to be drained on one side only of plate 51 (FIG. 4) or to use with materials, which are solid at room temperature (FIG. 5). Once the liquid has been disposed on the upper side of plate 51, the plate 51 is moved to the vertical, liquid-draining position shown, after which the draining liquid assumes the characteristic gravity drain configuration for that material. With this construction the draining film is automatically set in a predetermined position relative to collimated monochromatic light source 52 aligned with photomultiplier 53.

Sharp edge 54 of plate 51 serves to limit the spread of liquid 56 as it is applied because of the effect of surface tension. Therefore, the draining film 56' will begin at edge 54 and distance $x$ is referenced to this boundary.

In the arrangement shown in FIG. 5 solid polymer sheet 61 is placed on horizontally disposed plate 62 and then heated above its glass temperature by means of adjustable heater 63. After liquification, the procedure is the same as in FIG. 4. Either of the apparatuses in FIGS. 4 or 5 would be housed in a lightproof box during conduct of the testing in the general manner shown for FIG. 2.

When the wave energy source is other than light, modifications, e.g. replacing the lightproof box, are necessary. If the equipment were to be used to measure the yield stress (or yield value) of paints or pastes an X-ray tube properly shielded would be an appropriate wave energy source.

Although the technique of applying the film to the flat plate may be different in the apparatus of FIGS. 4 and 5, this is unimportant so far as the use of a draining film to determine zero shear kinematic viscosity by the method of this invention.

Still a further arrangement for determining zero shear kinematic viscosity by first finding the slope of the surface of the draining film relative to the vertical surface of the substrate for the film is shown in FIG. 6. Wave energy, for example, ordinary visible light, is directed toward flat plate 71 (having a nonreflecting surface) from which film 72 is draining. If light is used, a lightproof container for the equipment is required, but not shown. As light from the fixed collimated light source 73 strikes the curved surface of draining film 72 at angle $\beta$ to a line NO normal to line OT tangent to the surface of film 72 at the point of impact O, reflected light leaves the point of impact at the same angle $\beta$ to the normal NO. For convenience, the light is directed perpendicular to plate 71 in which case tangent OT intersects plate 71 at angle $\beta$ as well. Photomultiplier 74 is movable along rack 76 by a motor (not shown) and during travel thereof will sense the position thereof at which maximum reflected light from 0 is received. In the simplest arrangement the photomultiplier 74 will move in a line RP perpendicular to the collimated light beam RO and the distance $d$ between this light beam RO and the photomultiplier is sensed as described below. Assuming $l$ to be very large compared to $h$ the following formula may be derived:

$$\tan \beta = \sqrt{1+\left(\frac{l}{d}\right)^2} - \frac{l}{d}$$

Thereafter, by substituting the value of tan $\beta$ in the equation below, the value at drain time $t$ of the zero shear kinematic viscosity $\eta_0/\rho$ may be calculated:

$$\tan \beta = 1/2 \sqrt{\left(\frac{\eta_0}{\rho}\right)\left(\frac{1}{gtx}\right)}$$

wherein: $g$ is the acceleration of gravity;
 $x$ is the distance to point 0 below the top of the wetted portion; and
 $t$ is the drain time from the moment the meniscus is broken as plate 71 is withdrawn from the sample liquid being tested by some means such as is shown in FIG. 2, for example.

During operation, means (not shown) sense the instant the bottom of plate 71 leaves the surface of sample 77 and immediately turn on recorder 78. As plate 71 continues in its upward movement the back side thereof may be wiped by flexible wiper blade 79. After any desired time lag as, for example, to permit adjustment of the draining film 72, photomultiplier 74 begins to hunt. The amount of light sensed by photomultiplier 74 is conveyed to recorder 78, where it is plotted as a function of drain time. As photomultiplier 74 moves along rack 76 the distance $d$ is sensed by the extent of penetration of metal rod 80 into transducer 81. The sensed position is then recorded as a function of drain time so that at the instant photomultiplier 74 indicates maximum reflected light, its position relative to the light source 73 (distance $d$) and the drain time are all known.

The values for $x$, $l$ and $g$ will all be known, of course, and it is then a simple problem to calculate $\eta_0/\rho$ (or to have this done automatically). Although angle $\beta$ is continually changing as the film 72 drains, the actual angle need not be determined. This discussion is intended to illustrate the principal involved and the specific aspects may be practiced other than as illustrated. For example, photomultiplier 74 may hunt in a direction other than vertical or other sources of wave energy may be employed, e.g. radar.

The liquid being tested may be colorless, or colored, clear or opaque and within a wide range of viscosities as noted hereinabove but the draining liquid must have an index of refraction different from that of the gas through which the wave energy passes, usually air.

A typical example of the type of data obtained during the drainage of a Newtonian liquid is presented in Table I. This liquid, which is dioctylphthalate, has an $\alpha$ value of 48.9 cm.[11] at a wave length of 2975 A. This table contains a tabulation of the optical densities obtained at different times during the drainage process as well as the corresponding calculated viscosities. The drainage times given in the table were chosen at random from the recorder trace.

The results of a comparison made between viscosity values determined using the draining plate technique and values determined by using an Ostwald-type viscometer and a Weissenberg-type rheogoniometer are presented in Table II. Each viscosity value shown in the table is the arithmetic mean of viscosity values as determined for a given run using Equation (2). While these data support the contention that a draining plate can be used to measure viscosities over a range from about $10^{12}$ to $10^3$ stokes, the technique can be used over a considerably broader range of viscosities, for example, $10^{12}$ to $10^5$ stokes.

TABLE I

| $\ln \frac{I_0}{I}$ | T (secs.) | $\eta/\rho$ (stokes) |
|---|---|---|
| 0.70 | 7.5 | 0.520 |
| 0.52 | 15.0 | 0.573 |
| 0.43 | 22.5 | 0.587 |
| 0.38 | 30.0 | 0.610 |
| 0.31 | 45.0 | 0.610 |
| 0.27 | 60.0 | 0.616 |
| 0.24 | 75.0 | 0.610 |

TABLE II

| Material (Proportions by weight) | Draining plate ($\eta/\rho$ stokes) | Ostwald-type viscometer (stokes) | Rheogoniometer (stokes) |
|---|---|---|---|
| Dioctylphthalate ($\alpha$=48.9 cm.[-1] at 2,975 A.) | 0.591 | 0.585 | |
| Arochlor 1254 (chlorinated biphenyl ($\alpha$=8.75 cm.[-1] at 3,525 A.) | 52.30 | 51.01 | |
| 70% $\beta$-pinene, 30% mineral oil ($\alpha$=4.5 cm.[-1] at 3,450 A.) | 272 | | 261 |

In Table III the same sort of comparison is made with several non-Newtonian liquids, however, no Ostwald-type viscometer readings were taken, because of the non-Newtonian nature of the liquids.

TABLE III

| Material (Proportions by weight) | Draining plate ($\eta_0/\rho$ stokes) | Rheogoniometer ($\eta_0/\rho$ stokes) |
|---|---|---|
| 3% polystyrene, 97% chlorinated biphenyl ($\alpha$=5.24 at 3,600 A.) | 550 | 527 |
| 10% polyisobutylene, 90% decahydronaphthalene ($\alpha$=5.22 at 2,800 A.) | 1,795 | [1] 1,610 |
| Methyl-phenyl silicone ($\alpha$=8.6 at 2,740 A.) | 368 | [1] 330 |

[1] These are the values for kinematic viscosity at the lowest shear rate at which accurate experimental readings could be obtained.

If the intrinsic viscosity of a polymer in solution is the information desired, this is readily available from the zero shear kinematic viscosity of the dissolved polymer by general formula set forth hereinabove in defining intrinsic viscosity. In the expression $\eta/\eta_s$, *the zero shear kinematic viscosity determined by the practice of this invention is substituted for $\eta$ and the absolute viscosity of the solvent is divided by its density. All other terms in the formula remain the same.*

The draining plate rheometer has the following advantages when compared with known viscometers:
 1. the device can be easily cleaned,
 2. one plate can be used over a wide range of viscosities whereas for a capillary-type instrument, a tedious trial and error procedure is required to find the proper tube size to use,
 3. the presence of foreign matter entrained in the liquid will not restrict flow and give erroneous readings, and
 4. the procedure can be automated.

In those instances in which the liquid of which the molecular weight is to be determined has a high vapor pressure, compensation must be made for evaporation from the liquid film and this is accomplished by placing a small dish of the liquid in the lightproof chamber in which the draining plate device is located. The interior of the chamber is allowed to become equilibrated with the liquid in the dish prior to conduct of the viscosity determination.

In laboratory operations the rheometer of this invention can be used for monitoring the rate of cure of thermosetting polymers and for quality control measurements of the flow consistency of wire enamels, varnishes and paints. In process control operations sequential readings from this instrument can be used to monitor the average molecular weight of a polymer during polymerization.

This invention is particularly significant in that no judgment factor is required in the determination of shear viscosities by this method and it can be certain that the results will be accurate to within a 4 percent error and can be made available in a considerably shorter period of time than is the case with earlier devices. Obviously Obviously many modifications and variations of this invention are possible in the light of the above teachings. For example, the substrate employed in any of the embodiments need not be a flat plate; in the slope-determining apparatus the sensing device may move in a fixed path, which is curved and is not limited to a vertical plane, and the path of incident wave energy may be made to coincide with the path of reflected wave energy in which case the sensing device will actually sense the normal to the tangent to the film at the finite area of wave energy impact. It is, therefore, to be understood that within the scope of the appended claims the invention may be practiced otherwise than as specifically described.

I claim:

1. In an apparatus for the determination of the thickness of a liquid film wherein energy from a wave energy source is directed at and through said liquid film supported in a substantially vertical orientation on a substrate, the improvement of means for determining the thickness of the liquid film in the draining mode as a function of time comprising in combination with the wave energy source:
   a. means spaced from said wave energy source and located in the path of energy transmission therefrom for sensing and measuring wave energy transmitted from said wave energy source and received by said sensing and measuring means,
   b. means for supporting the substrate between said wave energy source and said sensing and measuring means in a predetermined elevational relationship to said path of energy transmission; and
   c. means connected electrically to said sensing and measuring means for recording as a function of time the energy measurements accomplished thereby.

2. The improvement substantially as recited in claim 1 wherein the substrate is a flat plate.

3. The improvement substantially as recited in claim 1 wherein the wave energy source emits monochromatic light and the substrate is a substantially transparent, nonreflective flat plate.

4. The improvement substantially as recited in claim 3 wherein the flat plate is made of quartz.

5. The improvement substantially as recited in claim 1 wherein the supporting means is adapted to selectively position the substrate in horizontal and vertical positions.

6. Apparatus for determining parameters of a liquid film draining from a vertically disposed substrate comprising in combination:
   a. a longitudinally-extending substrate adapted for support in a vertical position at a predetermined height;
   b. means spaced from the vertical surface of said substrate for directing wave energy toward said surface; and
   c. means located on the same side of said surface as said wave energy directing means for sensing wave energy received by said sensing means;
      1. said sensing means being directed toward said surface to receive wave energy reflected from the direction thereof;
      2. one of said sensing and wave energy directing means being mounted for movement relative to the second of said sensing and wave energy directing means and to a finite area on said surface; and
   d. means connected to the movable one means for determining the position thereof relative to the second means.

7. Apparatus for determining the slope of a liquid film draining from a vertically disposed substrate substantially as recited in claim 6 wherein the substrate in is a flat plate.

8. Apparatus for determining the slope of a liquid film draining from a vertically disposed substrate substantially as recited in claim 6 wherein the wave energy directing means employs ordinary visible light and the substrate is a nonreflective flat plate.

9. Apparatus for determining the slope of a liquid film draining from a vertically disposed substrate substantially as recited in claim 8 wherein the light is directed perpendicular to the flat plate and the sensing means moves in a straight vertical path.

10. Apparatus for determining parameters of a liquid film draining from a vertically disposed substrate comprising in combination:
   a. a longitudinally-extending substrate adapted for support in a vertical position at a predetermined height;
   b. means spaced from the vertical surface of said substrate for directing wave energy toward said surface; and
   c. means located on the same side of said surface as said wave energy directing means for sensing wave energy received by said sensing means;
      1. said sensing means being directed toward said surface to receive wave energy reflected from the direction thereof; and
      2. one of said sensing and wave energy directing means being mounted for movement relative to the second of said sensing and wave energy directing means and to a finite area on said surface;
   d. means connected to the movable one means for determining the position thereof relative to the second means; and
   e. means connected to said determining means for recording as a function of time the information generated by said determining means.